United States Patent [19]

Carey, Jr.

[11] 4,224,901
[45] Sep. 30, 1980

[54] COMBINATION INNER FLEA-TICK COLLAR AND OUTER PROTECTIVE COLLAR, FOR ANIMALS

[76] Inventor: Sam H. Carey, Jr., P.O. Box 14031, Orlando, Fla. 32807

[21] Appl. No.: 30,519

[22] Filed: Apr. 16, 1979

[51] Int. Cl.³ ............................................. A01K 27/00
[52] U.S. Cl. ..................................................... 49/106
[58] Field of Search ........................ 119/106, 156, 109

[56] References Cited
U.S. PATENT DOCUMENTS
2,219,569  10/1940  Vanderhoof ...................... 119/106

*Primary Examiner*—Jay N. Eskovitz
*Attorney, Agent, or Firm*—Alfred E. Wilson

[57] ABSTRACT

A combination animal collar including an outer collar portion, formed of a suitable material such as leather or nylon, for example, presenting a generally conventional outward appearance when positioned on a dog or cat, for example, and an inner collar portion, formed of a suitable insecticide impregnated material, press fitted into a longitudinally extending recess formed in the inner side of the main central length of the outer collar portion. The undersides of opposed buckle and holed end portions of the belt, outwardly of the recess, have insecticide impregnated adhesive tape portions secured thereto, extending from the respective ends of the insecticide impregnated inner collar portion to the respective extended ends of the buckle and holed ends to provide for a full 360 degree encirclement of an animal's neck by insecticide impregnated material.

10 Claims, 4 Drawing Figures

U.S. Patent  Sep. 30, 1980  4,224,901
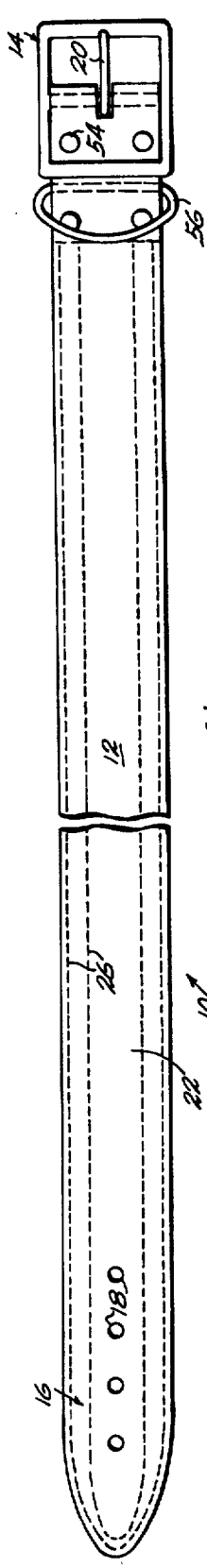
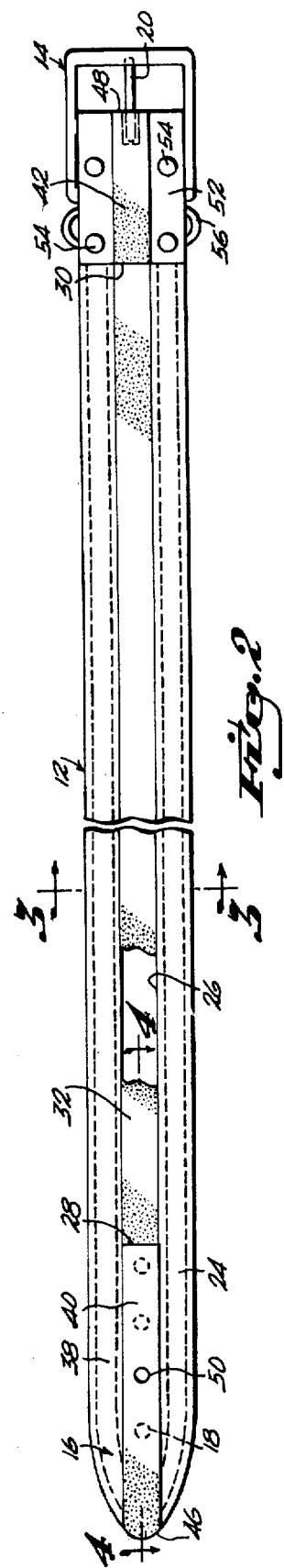
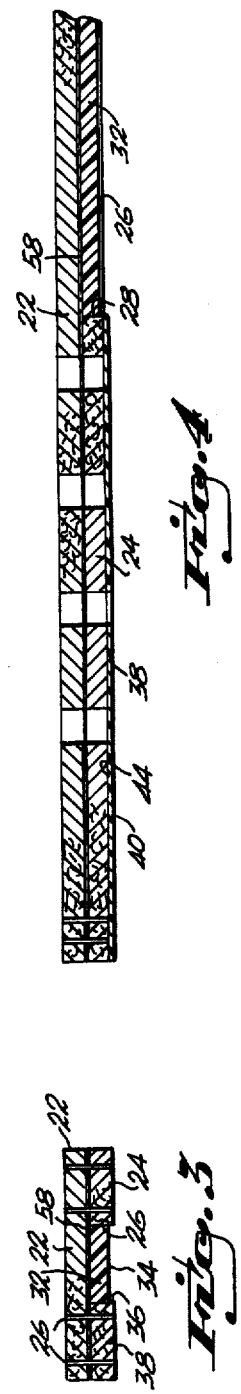

COMBINATION INNER FLEA-TICK COLLAR AND OUTER PROTECTIVE COLLAR, FOR ANIMALS

BACKGROUND OF THE PRESENT INVENTION

The present invention pertains to a pet collar of the type commonly referred to as a "flea and tick collar", and more particularly to a collar of this type which protectively hides a flea and tick collar portion within an outer collar portion formed of a suitable material such as leather or nylon. The collar of the present invention provides for a full 360 degree protection about an animal's neck without direct contact of the chemicals with the skin of the animal while providing a protective barrier again rain, snow and sleet.

It has been confirmed from a reliable professional source that, in order for insecticide impregnated plastic strips, sponges, cloths etc. to work effectively, they must complete a 360 degree circle about an animal's neck. Fleas, the most common pet pest, need to drink water, this water is supplied by way of visiting the animal's eyes daily. They take a path of least resistance in accomplishing this visit and if there is any unprotected portion of the circle about an animal's neck, many fleas safely accomplish the round trip.

Many animals are adversely affected by direct contact with the skin by the chemicals in flea and tick collars, particularly when wet. Many cases of varying skin rashes, etc. have resulted, and, in the most serious cases, have resulted in death of the animals.

All currently manufactured flea and tick collars are completely exposed to the atmosphere. The side edges and outside faces of these collars provide very little or no protection to the animal, yet the insecticides vaporize thereabout and are lost into the surrounding atmosphere. Sun and wind contribute to the rapid deterioration of completely unprotected collars of this type, and rain spreads the chemicals over the immediate skin areas of the neck.

STATE OF THE PRIOR ART

U.S. Pat. Nos. 3,814,061 to Aries et al, 4,047,505 to McAndless, 2,401,253 to Lamb, 2,349,713 to Finch and 2,219,569 to Vanderhoof illustrate various forms of protective collars incorporating insecticide impregnated inserts with outer protective collar portions. However, all of them fail to distribute protective vapors about the full 360 degree girth of the neck of the wearer, the Vanderhoof patent additionally permits direct contact of the impregnated pad with the skin in the neck area.

U.S. Pat. No. 3,972,820 to Drehman permits a very limited escape of the vapors from the impregnated pad through a series of spaced apart lace holes and would be very ineffective. U.S. Pat. No. 3,765,376 to Higgins provides an ornamental jeweled or beaded attachment for a conventional flea and tick collar and solves none of the problems inherent in collars of this type.

OBJECTS AND ADVANTAGES OF THE PRESENT INVENTION

One of the principal objects of the present invention is to provide an animal collar of the type generally known as a flea and tick collar which includes an outer collar portion of a suitable material such as leather of a suitable synthetic material such as nylon, an inner collar portion of a suitable insecticide impregnated material press fitted into a longitudinally disposed recess in an inner side of the outer collar portion along a main central length thereof between opposed buckle and holed ends of the outer collar portion, and insecticide impregnated adhesive tape portions, preferable of the pressure sensitive type, extending from the respective ends of the inner collar portion to the respective extended ends of the buckle and holed ends of the outer collar portion to provide for a full 360 degree encirclement of an animal's neck.

A further object of the invention is to provide the recess in the inner side to a depth somewhat greater than the thickness of the impregnated inner collar portion to prevent contact thereof with the neck skin of the animal.

Yet another object of the invention is to provide a relationship of the outer collar portion and the impregnated inner collar portion and tape sections that protects said inner collar portion and tape sections from the weather elements such as sun, wind, rain, snow, etc.

BRIEF DESCRIPTION OF THE DRAWINGS

FIG. 1 is a plan view of the outer, normally exposed surface of the combination pet collar of the present invention;

FIG. 2 is a plan view of the inner side of the collar of FIG. 1;

FIG. 3 is an enlarged cross sectional view taken along line 3—3 of FIG. 2; and

FIG. 4 is an enlarged fragmentary longitudinal sectional view taken along line 4—4 of FIG. 2.

DETAILED DESCRIPTION OF A PREFERRED EMBODIMENT

With reference to the drawings in which like reference characters designate like or corresponding parts throughout the several views, and with particular reference to FIG. 1, the combination collar, generally indicated at 10, includes a main central length 12 of an outer belt portion, with a buckle 14 fixed to a first end thereof and a holed second end 16 provided with a plurality of spaced apart, longitudinally aligned slots or holes 18 for selective engagement by the buckle tongue 20, when fixed about the neck of an animal, such as a dog or cat, in the conventional manner.

As best indicated in FIGS. 3 and 4, the outer belt portion is preferably formed of two plies, an outer ply 22 and an inner ply 24 double stitched together along both sides as at 26. In a preferred form, the outer belt portion if fabricated of leather or a suitable synthetic material such as nylon.

With reference to FIGS. 2, 3, and 4, the inner ply 24 is cut out along a main central length to define a recess 26 extending between a line 28 at the holed end and a line 30 at the buckle end to receive an insecticide impregnated strip 32 in a press fitted relation. Strip 32 may be a commercially available flea and tick collar with the buckle cut off and sized to a proper length to fit recess 26 or it may be manufactured for this purpose. As best illustrated in FIGS. 3 and 4, the thickness of the impregnated strip 32 is slightly less than the thickness of the inner ply 24 whereby the exposed surface 34 of the impregnated strip 32 is slightly recessed at 36 relative to the inner surface 38 of inner ply 24 to prevent its contact with the neck skin of an animal.

It should also be noted that all of the effective vapors from the impregnatd inner collar portion or strip 32 are most effectively directed, while most of the effective vapors of the completely exposed commercially available collars simply dissipate into the atmosphere. In a preferred form the insert is formed of a proper insecticide impregnated plastic material.

As best illustrated in FIG. 2, a pair of insecticide impregnated tape portions 40 and 42, preferably formed with a pressure sensitive adhesive material on its inner side as at 44, FIG. 4, are secured to the inner surface 38 of the inner ply 24 to extend in a longitudinally aligned relation from the respective ends of the impregnated inner collar insert strip 32 to the respective collar ends 46,48 to provide for an effective completely encircling relationship with an animal's neck. The tape portions 40,42 may be cut from a supply roll and individually secured in place, or, alternatively, formed integrally with the insert strip 32. In use a hole such as 50 may be punched through the tape portion 40 in alignment with any of the holes 18 for through engagement by the buckle tongue 20.

The outer ply 22 of the outer belt portion may be turned inwardly as at 52 and riveted at 54 to secure the buckle 14 and a leash loop 56 in place in a conventional manner. If desired, both plies 22 and 24 may be turned over and so riveted.

With the combination collar of the present invention, the inner flea and tick collar portion is never in evidence when placed on a dog or cat, for example, and is ideal for show animals as well as the every day owner, and the impregnated insert and tapes may be changed in a matter of seconds. As illustrated in FIGS. 3 and 4, a vapor barrier 58 is preferably provided between the plies 22,24, which may be in the form of a good grade marine varnish, for example.

The buckle and holed ends 14 and 16 normally hang downwardly when placed on a pet and the tape portions 40,42, therefore, do not come in contact with the skin, however, if desired, a shallow recess may be provided in these end portions to receive the tapes 40 and 42.

I claim:

1. In a combination, an animal collar comprising an outer collar portion of a predetermined overall length and width, including a main central length terminating at a first end in a buckle end portion and at a second end in a buckle engaging portion; means for selectively attaching said buckle and buckle engaging portions relative to each other to define a generally circular configuration of the collar of a preselected size, an inner collar portion comprised of an insecticide impregnated strip, sized for press fitted engagement within the length of a recess formed longitudinally centrally of an inner side of said main central length, a first insecticide impregnated tape portion including adhesive means along one face thereof in fixed engagment along said inner side and extending from a first end of said impregnated strip to a distal end of said buckle end portion.

2. The combination as defined in claim 1 wherein said means for selectively attaching comprises a buckle, fixed to said buckle end portion in any conventional manner, and plurality of longitudinally aligned holes in said buckle engaging portion for selective through engagement by a tongue of said buckle when said buckle engaging and end portions are properly engaged.

3. The combination as defined in claim 1 wherein at least said outer collar portion main central length and buckle engaging portion are formed of two plies, an outer and an inner ply, marginally stitched together along their lengths.

4. The combination as defined in claim 3 wherein said recess is defined by an appropriate cut out in said inner ply.

5. The combination as defined in claim 4 including a water barrier interposed between said outer and inner plies.

6. The combination as defined in claim 1 wherein said outer collar portion is formed of an appropriate durable material such as leather or a synthetic material such as nylon.

7. The combination as defined in claim 1 wherein said insecticide impregnated strip is formed of a suitable synthetic material.

8. The combination as defined in claim 4 wherein said recess is of a slightly greater depth than a predetermined thickness of said impregnated strip.

9. The combination as defined in claim 1 wherein said adhesive means is of the pressure sensitive type and said first and second insecticide impregnated tapes are formed separately of said impregnated strip, whereby a roll form of insecticide impregnated tape may be provided, from which said first and second tapes may be cut to size.

10. The combination as defined in claim 1 wherein said impregnated strip and first and second impregnated tapes are integrally formed.

* * * * *